United States Patent
Meier

(10) Patent No.: US 7,529,285 B2
(45) Date of Patent: May 5, 2009

(54) FREQUENCY STABILISED GAS LASER

(75) Inventor: Dietrich Meier, Niedererlinsbach (CH)

(73) Assignee: Leica Geosystems AG, Heerbrugg (CH)

( * ) Notice: Subject to any disclaimer, the term of this patent is extended or adjusted under 35 U.S.C. 154(b) by 43 days.

(21) Appl. No.: 11/548,038

(22) Filed: Oct. 10, 2006

(65) Prior Publication Data
US 2007/0147446 A1    Jun. 28, 2007

(30) Foreign Application Priority Data
Oct. 14, 2005    (CH) ..................... 1665/05

(51) Int. Cl.
*H01S 3/03* (2006.01)
(52) U.S. Cl. .................. 372/61; 372/50.21; 372/55; 372/58; 372/59
(58) Field of Classification Search .................. 372/55, 372/58, 50.21, 59, 61
See application file for complete search history.

(56) References Cited

U.S. PATENT DOCUMENTS

| | | | |
|---|---|---|---|
| 4,987,574 A * | 1/1991 | Rowley et al. ................ | 372/28 |
| 5,617,440 A | 4/1997 | Meier | |
| 6,434,176 B1 | 8/2002 | Deck | |

FOREIGN PATENT DOCUMENTS

GB    2 331 177    5/1999

WO    88/01799    3/1988

OTHER PUBLICATIONS

Balhorn, R., et al.; "Frequency Stabilization of Internal-Mirror Helium-Neon Lasers"; Applied Optics USA; vol. 11, No. 4; Apr. 1972; pp. 742-744; XP002390349.

* cited by examiner

*Primary Examiner*—Minsun Harvey
*Assistant Examiner*—Yuanda Zhang
(74) *Attorney, Agent, or Firm*—Rankin, Hill & Clark LLP

(57) ABSTRACT

A method for the frequency stabilization of a gas laser with a laser tube (1), in stable operation includes a continuous operation control procedure with the following steps:
  Operating the gas laser for the radiation of laser light;
  measuring an intensity of one component of the radiated laser light with a detector (8);
  adjusting a tube temperature of the laser tube (1) by means of a control system (7), so that the measured intensity is controlled to a set-point value.

During a startup phase, the procedure includes the following steps:
  Measuring an ambient temperature;
  controlling the condition of the laser tube (1) by means of the control system (7) to a set-point state, wherein the set-point state corresponds to a temperature of the laser tube (1) at the measured ambient temperature in the steady condition without any further heating or cooling; and
  switching over to the continuous operation control.

11 Claims, 3 Drawing Sheets

FREQUENCY STABILISED GAS LASER

BACKGROUND OF THE INVENTION

The invention is related to the field of frequency stabilization of gas lasers, in particular to a frequency stabilized gas laser and to a method for the frequency stabilization of a gas laser.

DESCRIPTION OF RELATED ART

For interferometric measurements by means of laser light, the wavelength and respectively the frequency of the laser light has to be maintained as constant as possible. A frequency stabilization utilised for this purpose is known, for example, from U.S. Pat. No. 5,617,440. In it, a device for the heating and cooling of a cylindrical laser tube of a gas discharge laser for interferometric measurements is described. By means of Peltier—elements, the temperature of the laser tube is maintained at a constant temperature, so that also the distance between the mirrors at the end of the tube remains constant. The method of control utilised for this purpose is furthermore also described in "Frequency Stabilization of Internal-Mirror Helium-Neon Lasers", R. Balhorn, H. Kunzmann, F. Lebowsky, Applied Optics Vol. 11, No. 4, April 1972.

BRIEF SUMMARY OF THE INVENTION

It is the objective of the invention to create a frequency stabilized gas laser and a method for the frequency stabilization of a gas laser of the type described above, which reduce the overall energy consumption of the laser. It is a further objective of the invention to reduce the startup time for the laser. A still further objective of the invention is to minimize thermal loads on the laser and on its support.

This objective is achieved by a frequency stabilized gas laser and by a method for the frequency stabilization of a gas laser according to the invention.

The method for the frequency stabilization of a gas laser with a laser tube, in particular for operation in a laser interferometer, during stable operation comprises a continuous operation control with the following steps:

Operating the gas laser for the radiation of laser light;
measuring an intensity of at least one component of the radiated laser light;
adjusting a tube temperature of the laser tube, so that the measured intensity is controlled to a predefined set-point value;

wherein the method during startup of the gas laser, i.e., prior to the stable operation, comprises a startup control procedure with the following steps:

Measuring an ambient temperature;
controlling the condition of the laser tube at least approximately to a set-point state, wherein the set-point state corresponds a temperature of the laser tube at the ambient temperature in the steady condition without any additional heating or cooling; and
switching over to the continuous operation control.

The set-point state is therefore selected in such a manner, that it corresponds as well as possible to the condition which would come about after a longer period of time in continuous operation of the gas laser without any special heating or cooling. In this condition the laser tube is heated up solely by the power dissipation of the laser. In dependence of the ambient temperature, a state of equilibrium is reached, in which the temperature of the laser tube is somewhat higher than the ambient temperature. With the selection of this condition as set-point state in the continuous operation of the gas laser, very little energy is required for maintaining the temperature of the tube constant.

This is in contrast to known control procedures and systems, in the case of which the tube temperature is maintained constant at a predefined fixed value. Typically this temperature is significantly higher than the ambient temperature, so that the tube has to be heated continually. The heating power necessary is correspondingly great, as is the changing thermal load on the laser and on its carrier.

In the context of this application, the term "ambient temperature" designates the temperature outside the measurement instrument, i.e. at the outside of housing parts arranged around and being in a fixed relation to the laser tube. Typically, the ambient temperature will be the temperature in the room in which the instrument is operated.

Because the final temperature of the system is known, the control system is in a position to purposefully run up to this temperature and therefore to reach it significantly more rapidly than by the asymptotic running up to the temperature in accordance with the prior art.

In preference, the startup control procedure comprises the following steps:

Measuring the ambient temperature;
measuring the tube temperature of the laser tube;
determining an actuating control variable in accordance with the ambient temperature and the tube temperature;
adjusting the temperature of the gas laser in such a manner that the actuating control variable is controlled at least approximately to zero;
switching over to the continuous operation control.

The adjustment of the temperature of the gas laser for stabilization of the actuating control variable is therefore iteratively repeated until the control deviation, respectively the difference value is sufficiently small, or until the variation of the actuating control variable in a time window of predefined length lies below a predefined limit.

In a first preferred embodiment of the method, the actuating control variable is a number of modes of the gas laser. This embodiment is based on the finding that the radiated laser light in case of a temperature change, and with this a change in length of the laser tube, passes through several oscillation modes, and that the temperature change between the current tube temperature and the temperature in the set-point state therefore corresponds to a certain number of modes passed through. In order to consequently get the laser tube to the set-point state, it is heated up and the modes passed through during the heating up are counted. Because the laser tube and its housing bring about a certain retardation of the heat distribution, the heating up power is reduced or the heating up is completely stopped before the complete number of modes to be passed though has been reached.

In preference, following a first number of modes passed through, the heating with maximum power is stopped, and thereupon during a second number of modes heating takes place only with a reduced heating power or cooling takes place with full or reduced power, so that overall the tube and the elements connected with it in a heat conducting manner in all reach the target temperature corresponding to the set-point state in an optimum time. In order to be able to both heat and cool, Peltier elements are utilised for this purpose.

The first and the second number of modes for a time optimized temperature course are capable of being determined experimentally and/or by means of model calculations of the heat distribution within the system. In a simple preferred embodiment of the invention, the complete number of modes to be passed through is determined experimentally. In doing so, the whole system is first brought to a certain ambient temperature, i.e., that a temperature of the laser tube and of its housing is equivalent to the ambient temperature. Thereupon, the laser is operated without any cooling or additional heating, until the temperature of the laser tube has stabilized at a constant value. This takes, for example, 20 to 30 minutes. During the heating up, the number of modes passed through is counted. With this, the number of modes to be passed through for this ambient temperature is known, and equally the target temperature of the laser tube. For a tube it is known, respectively, measurable, how many modes are passed through in case of a temperature change of one degree Centigrade. This temperature factor F typically amounts to between 2 and 3 modes per ° C.

For combined heating up, heating with reduced power or cooling, the first and the second number of modes is established empirically on the basis of a fixed ratio or by simulation or through experiments. An example of fixed ratios of this type is, for example, (wherein the results respectively are rounded to integral values):
1. 95% of the number of modes for heating up (in particular with maximum power),
2. 5% for heating up with reduced power or for cooling.

Following step 2 or already following step 1, the controller is switched over to the mode control corresponding to the continuous operation control. As a result, by heating and/or cooling the remaining control error in the optical light power is equalized and subsequently maintained as constant as possible.

In a preferred embodiment of the invention, the complete number of modes to be passed through and with this also the first and/or the second number is/are adapted on the basis of measurements of the tube temperature. With this, a partially heated up condition following an interruption of the operation is able to be taken into account. If the difference between the tube temperature and the ambient temperature at the beginning of the startup control exceeds a predefined threshold, the number of modes to be passed through is reduced in accordance with this difference. This may take place, for example, in the following manner. For a tube, it is known or is measurable how many modes are passed through in case of a temperature change of one degree Centigrade. This temperature factor F typically amounts to between 2 and 3 modes per ° C. If, therefore, the difference between the tube temperature and the ambient temperature amounts to dT, then in preference the complete number of modes to be passed through is reduced by dT·F (rounded to an integral number).

The dependence of the number of modes to be passed through on the two variables, ambient temperature and tube temperature, is capable of being represented also functionally equivalent and reproduced. Therefore, for example, it is possible to utilize two-dimensional tables (arrays), polynomial approximation or a combination of these. In a more elaborate control system, it is also possible to additionally take the temperature of the oven into account.

In a second embodiment of the method, the actuating control variable is a temperature difference and is equivalent to the difference between the measured tube temperature and the temperature of the laser tube in the set-point state. The temperature of the laser tube in the set-point state is, for example, experimentally established, as described above. The tube temperature is controlled to the set-point value on the basis of measurements of the tube temperature and optionally also on the basis of measurements of the oven temperature. As soon as the set-point value has been nearly reached or when it does not change anymore during a predefined time period, the controller is switched over to the mode control corresponding to the continuous operation control.

In a further preferred embodiment of the invention, during the operation, monitoring takes place, as to whether the device in the stationary condition is really only minimally heated or cooled. On the basis of model deviations or in particular in the case of a longer operation, on the basis of a change in the ambient temperature it is possible, that a continual cooling or heating takes place. This is detected, if following the switching on and the operation of the mode control in the stabilized condition, the Peltier current, respectively, the cooling— or heating power of the Peltier elements exceeds a predefined threshold. If this occurs, the user is asked whether a re-adjustment of the control system may be carried out. This is necessary, because during a re-adjustment it is not possible to carry out any measurements with the interferometer. If a re-adjustment is permitted, the number of modes to be passed through, for example, as described further above, is determined taking into account the tube temperature.

The frequency stabilized gas laser, in particular for utilization in a laser interferometer, therefore comprises:
A laser tube for the radiation of laser light,
a detector for measuring an intensity of at least one component of the radiated laser light, and
a control system, which in a first operating condition is implemented as a continuous operation control, in the case of which continuous operation control for the adjustment of the tube temperature of the laser tube the measured intensity is controlled to a predefined set-point value,
an ambient temperature sensor, and
a set-point generating unit for determining a set-point state, wherein the set-point state of a temperature of the laser tube at the measured ambient temperature in the steady condition corresponds to a temperature of the laser tube without any further heating or cooling,
wherein the control system in a second operating condition is implemented as a startup control system, in the case of which startup control system the condition of the laser tube is controlled to at least approximately this set-point state, and subsequently a switching over to the continuous control system takes place.

In preference, the gas laser for restarts, in the case of which the tube is not cooled down to the ambient temperature, e.g., following short interruptions of operations, furthermore comprises a tube temperature sensor, wherein the set-point generating unit is designed for the determination of an actuating control variable in accordance with the ambient temperature and the tube temperature, and the control system in the second operating condition for the adjustment of the temperature of the gas laser is designed in such a manner that the actuating control variable is controlled to nearly zero.

Further preferred embodiments follow from the dependent claims. In doing so, the characteristics of the method claims are capable of being combined with the device claims in analogy to the general sense and vice versa.

BRIEF DESCRIPTION OF THE DRAWINGS

In the following, the object of the invention is explained in more detail on the basis of preferred examples of embodiments, which are illustrated in the attached drawings. These schematically respectively illustrate.

The reference marks utilized in the drawing and their significance are listed in summary in the list of reference marks. On principle, in the Figures, the same reference marks are utilized for the same parts.

DETAILED DESCRIPTION OF THE INVENTION

Figure 1:
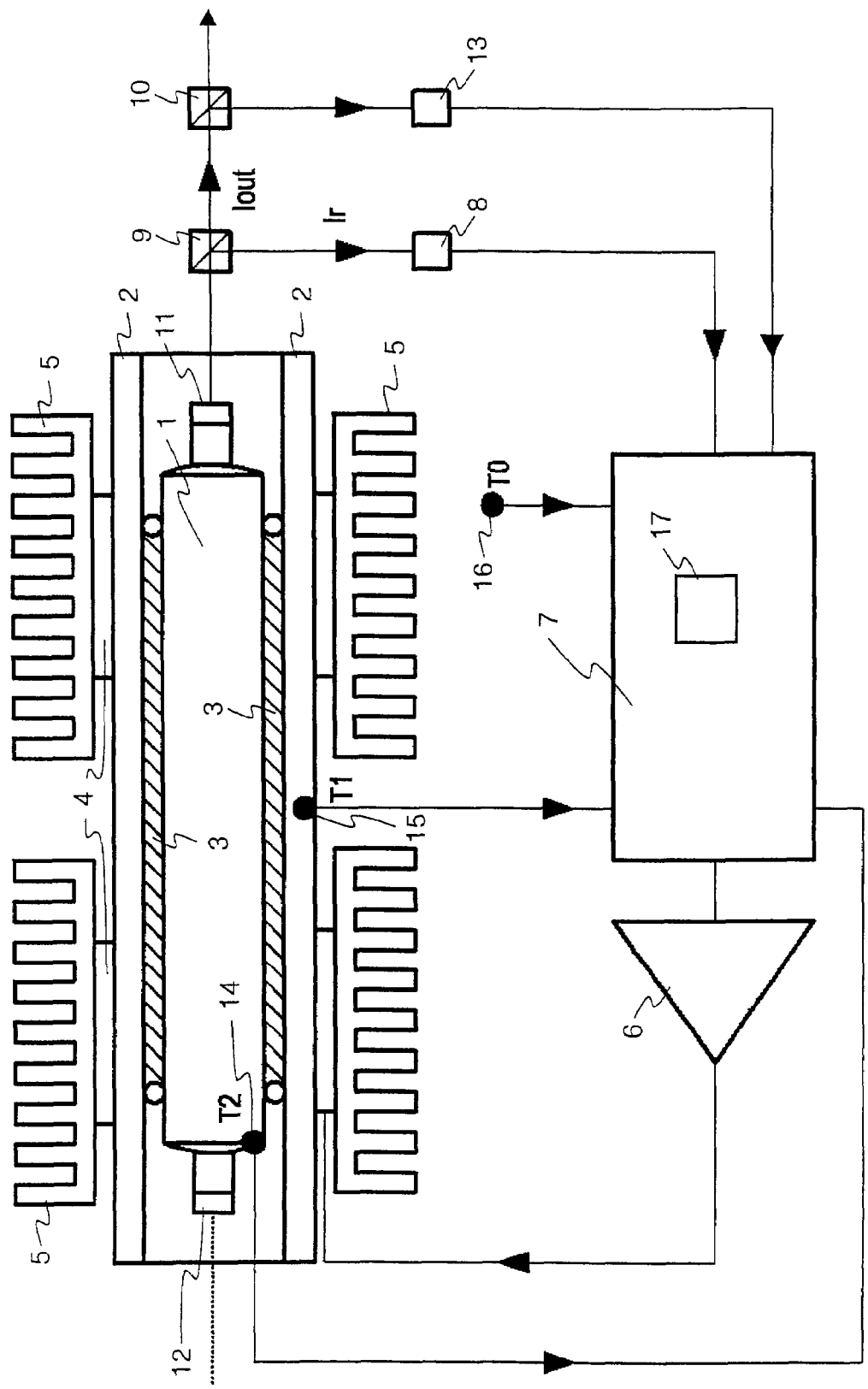
FIG. 1 a structure of a gas laser with a control system for the frequency stabilization in accordance with the invention.

FIG. 1 illustrates a structure of a gas laser with a control system for the frequency stabilization in accordance with the invention. A laser tube 1, for example, a HeNe—laser, is accommodated in a metal tube or metal housing 2, also referred to as oven. A space between the laser tube 1 and the metal housing 2 is filled with a heat conducting paste 3. On the metal housing 2, Peltier elements 4 for the heating or cooling of the metal housing 2 are attached. The Peltier elements 4 are driven through a power amplifier 6 in correspondence with an output of a controller 7. For the radiation, respectively, absorption of the heat transported by the Peltier elements 4, these comprise Peltier cooling elements 5. The laser tube 1 comprises a rear mirror 12 and a front mirror 11, wherein the main proportion of the radiated laser light exits from the laser tube 1 through the front mirror 11.

In order to be in a position to stabilize the frequency and the wavelength, in the beam path of this radiated light a polarization splitter 9 is arranged, which transmits light Iout in a first direction of polarization and deflects light Ir in a second direction of polarization at right angles to it and conducts it on to a detection diode 8. From the transmitted light Iout, in an optional beam splitter 10 a proportion, for example, 10% is split-off and conducted to a second detection diode 13. With the second detection diode 13, therefore, a measurement of the absolute value of the radiated laser light is possible. In another embodiment of the invention, the detection diode 8 and/or the second detection diode 13 are arranged on the other side of the laser tube 1 and detect light, which is radiated through the rear mirror 12.

The control system 7 is designed for the detection of temperatures by means of a tube temperature sensor 14, an optional oven temperature sensor 15 and an ambient temperature sensor 16.

The control system 7 is designed for the frequency stabilization of the laser. For this purpose, it comprises two operating modes:

A first operating mode comprises a continuous operation control procedure or a mode control procedure in accordance with the references mentioned at the beginning. In this, the heating, and respectively, cooling of the laser tube 1 by means of the Peltier elements 4 is controlled in correspondence with the intensity measured by the detection diode 8.

A second operating mode comprises a startup control procedure. In this, the heating up of the system consisting of the laser tube 1, metal housing 2, heat conducting paste 3 and Peltier elements 4 is controlled or closed-loop controlled in accordance with the temperatures of the ambient temperature sensor 16, the tube temperature sensor 14 and possibly the oven temperature sensor 15. In this, the heating up is controlled or closed-loop controlled in correspondence with the intensity measured by the detection diode 8 and a mode counting derived from it.

Figure 2:
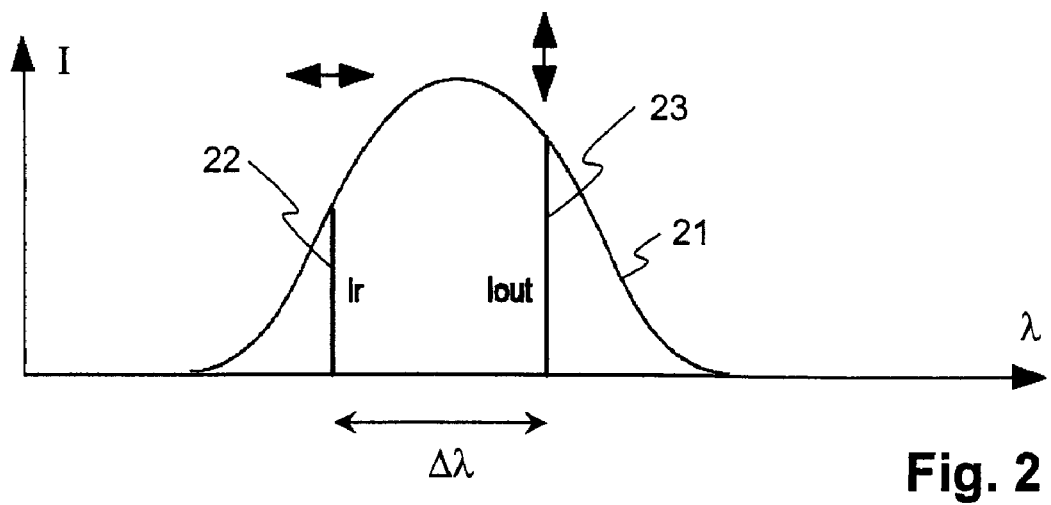
FIG. 2 an amplification curve for the illustration of the principle of the wavelength stabilization.

The first operating mode in the following is briefly explained for the purpose of completeness. FIG. 2 illustrates an amplification curve 21 for the illustration of the principle of the wavelength stabilization by the mode control. The amplification curve represents the intensity I of the light radiated by the laser in function of its wavelength $\lambda$. The center of gravity of the amplification curve 21 lies at the resonance frequency of the laser utilised. In correspondence with the length of the laser tube 1, respectively, the distance between the mirrors, linearly polarized oscillation modes 22, 23 are produced. Two adjacent oscillation modes respectively oscillate at right angles to one another. This is indicated in FIG. 2 by double arrows above the oscillation modes 22, 23. The frequencies, and respectively, wavelengths of adjacent oscillation modes 22, 23 differ from one another by a fixed frequency amount, or, respectively, by a wavelength amount $\Delta\lambda$, which itself is a function of the length of the laser tube 1. The amplitude of the individual modes 22, 23 is given by the amplification curve 21. In FIG. 2 this is illustrated with the example of a relatively short laser tube 1, in the case of which only two modes 22, 23 occur under the amplification curve of the laser. Both longitudinal modes 22, 23 have a slightly differing wavelength, of which only one is to be utilised for interferometric measurements. With the polarizing beam splitter 9 at the outlet and outside the laser tube 1, the light of the two modes 22, 23 is separated. The intensity Ir of the beam proportion deflected by 90 degrees is measured, A/D—converted and through the control system 7 utilised for controlling the control current of the Peltier elements 4. The control system 7 is designed in such a manner, that the decoupled light intensity Ir is maintained constant at a set-point value. In doing so, through the operating temperature of the housing 2 the length of the laser tube 1 is controlled, and with it the modes 22, 23 are displaced underneath the amplification curve of the laser. The set-point-value, for example, is selected in such a manner, that the intensity of the decoupled proportion of light Ir is significantly lower than that of the utilized light proportion Iout. For example, the decoupled light proportion Ir is controlled to a value which corresponds to one fifth to one half of the utilized light proportion Iout. The set-point value, to which the decoupled light proportion is controlled, is predefined fixed. With this, the position of the decoupled mode 22 relative to the amplification curve is stabilized, and therefore, indirectly also the position of the mode 23 of the utilized light proportion.

In order to take into account the case, that the amplification curve 21 is lowered due to aging, it is also possible to measure the intensity of the utilized light proportion Iout by means of the beam splitter 10 and the second detection diode 13. A lowering of this intensity Iout indicates that the amplification curve 21 is situated lower than originally. Consequently, when controlling the decoupled light proportion Ir to a constant intensity in accordance with the set-point value, a too high wavelength would be adjusted. In order to reach the original wavelength of all light proportions again, the set-point value is correspondingly lowered.

In case of a temperature increase, each one of the modes is displaced to the right, first increasing in intensity and then decreasing again. Because successive modes are polarized at right angles to one another, the intensity of the utilized light signal Iout varies and in phase opposition to it (i.e., with a phase difference of 180°) the intensity Ir of the decoupled light proportion. The number of the extremes passed through, therefore maxima and minima, of the decoupled light proportion Ir is therefore equivalent to the number of modes passed through. In this it is a matter of convention, as to whether the number of modes in only one direction of polarization or the number of modes in both directions of polarization is counted—the latter value is always double the first value.

A device for counting the number of modes passed through therefore in the case of a periodically varying signal determines the number of extremes. For practical reasons, in preference only such extremes are counted, which exceed a predefined absolute threshold value, and/or comprise a difference to the last extreme with inverted prefix.

In accordance with the invention, during the startup the ambient temperature T0 is measured by means of the ambient temperature sensor 16. In a first preferred embodiment of the invention, by a set-point generating unit 17 from the ambient temperature T0 out of a table or in accordance with a polynomial approximation, an overall number of modes to be passed through belonging to it is determined. If the tube temperature T2 is essentially equivalent to the ambient temperature T0, this overall number remains unchanged.

If at the beginning of the startup control, the tube temperature is higher than the ambient temperature T0, the laser tube 1 following an earlier operating phase has not yet cooled down to the ambient temperature T0. Therefore, the overall number of modes to be passed through is reduced in accordance with the difference between the tube temperature T2 and the ambient temperature T0.

Now the heating of the metal housing 2 through the Peltier elements 4 is operated with an as high as possible heating power. In doing so, it is possible that the oven, respectively, the metal housing 2 is overheated for a short time, because the heat in the following is once again distributed over the rest of the system. During the heating up of the laser tube 1, the modes passed through are counted. As soon as the number of modes passed through reaches a predefined number, which, for example, is situated one, two or three modes below the overall number of modes to be passed through, the heating is reduced or completely switched off. It is in principle also possible to change the poles of the Peltier elements 4 and to operate them for maximum or reduced cooling power with respect to the metal housing 2. After passing through a second number of modes, the control system is switched over to the mode control described above. In preference, the heating power is reduced to approximately one quarter during the last one or two modes. Then the mode control procedure is capable of stabilizing within a single mode.

It is also possible to carry out the switching over, at the latest, after a predefined time period, or if the temperature during a time window of predefined length running along with it does not leave a band with a predefined width.

The tube 1 now is in a condition, which is close to the condition, in which the tube 1, at the prevailing ambient temperature, would be just on the basis of its power dissipation. The heating or cooling effort necessary for the mode regulation is therefore minimal.

In the startup mode, it is possible that instead of the switching over in correspondence with the number of modes passed through, the control system is implemented as a PID-controller or as a state regulator or as a model based controller, which drives the heating, and respectively, cooling in such a manner, that on the one hand the overall number of modes to be passed through is passed through as rapidly as possible and that on the other hand after reaching this overall number the temperature remains as stable as possible.

Figure 3:
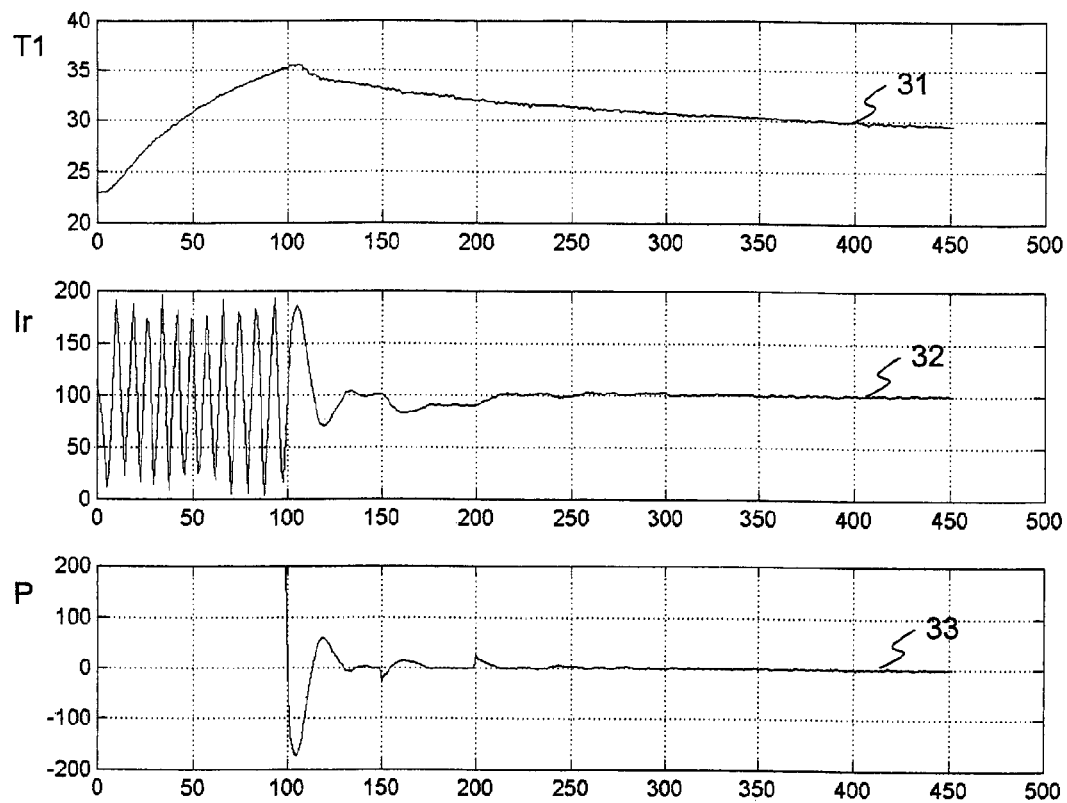
FIGS. 3 and 4 examples of courses of temperatures and light intensities during the evolving of the method for the frequency stabilization.
Figure 4:
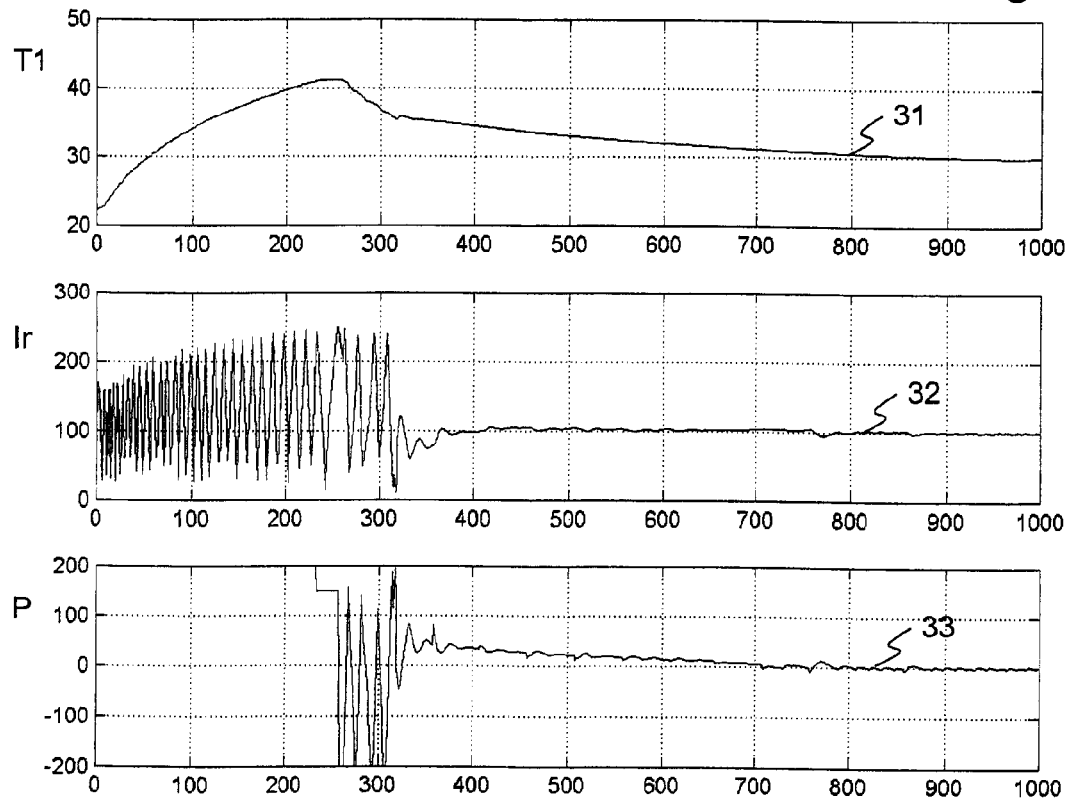

The FIGS. 3 and 4 illustrate examples of trajectories of temperatures and light intensities during the execution of the method for the frequency stabilization. In this, the uppermost trajectory 31 illustrates the temperature T1 of the metal housing 2, and the middle trajectory 32 the intensity Ir of the decoupled light detected with the detection diode 8. The lower trajectory 33 illustrates the power consumption P of the Peltier elements 4, wherein positive values correspond to a heating up of the metal housing 2 and negative values correspond to a cooling down of the metal housing 2. The numerical values on the abscissa correspond to the number of measuring points, wherein in FIG. 3 150 measuring points correspond to 75 seconds and in FIG. 4 300 measuring points correspond to a time duration of 150 seconds.

In FIG. 3 it is illustrated, how after 11 modes, approximately at the 100th measuring point, the Peltier elements 4 switch over from startup control to the continuous operation control. The oven temperature T1 of the temporarily overheated metal housing 2 thereupon declines and asymptotically approaches a final temperature of somewhat below 30° C. The tube temperature T2 is not indicated, from the values of the intensity measurement Ir and of the power output P, however, it is evident, that already at measuring point 220 the condition is essentially steady.

FIG. 4 illustrates, how after mode 28, approximately at the 230th measuring point, the heating power is reduced during one mode and thereupon the switching over to continuous control takes place. Here the control is steady after approx. the 400th measuring point. In this, however, the reduction of the heating power—during only a single period—is not yet sufficient, which leads to the consequence that following the switching over into the continuous operation mode three further modes are run over. But this does not have any significant influence on the Peltier power in the steady condition.

In a second preferred embodiment of the invention, the set-point generating unit 17 determines a set-point temperature for the tube temperature, based on the ambient temperature and by means of a table lookup or a polynomial approximation. Thereupon the tube temperature is controlled to this set-point temperature by the control system 7, wherein the measured tube temperature and optionally also the measured oven temperature are utilized for the control as actual values, respectively, as measuring values. For the preferably time-optimal control, it is possible to utilize a PID-control system, a state regulator, a model-based control system, etc.

Figure 5:
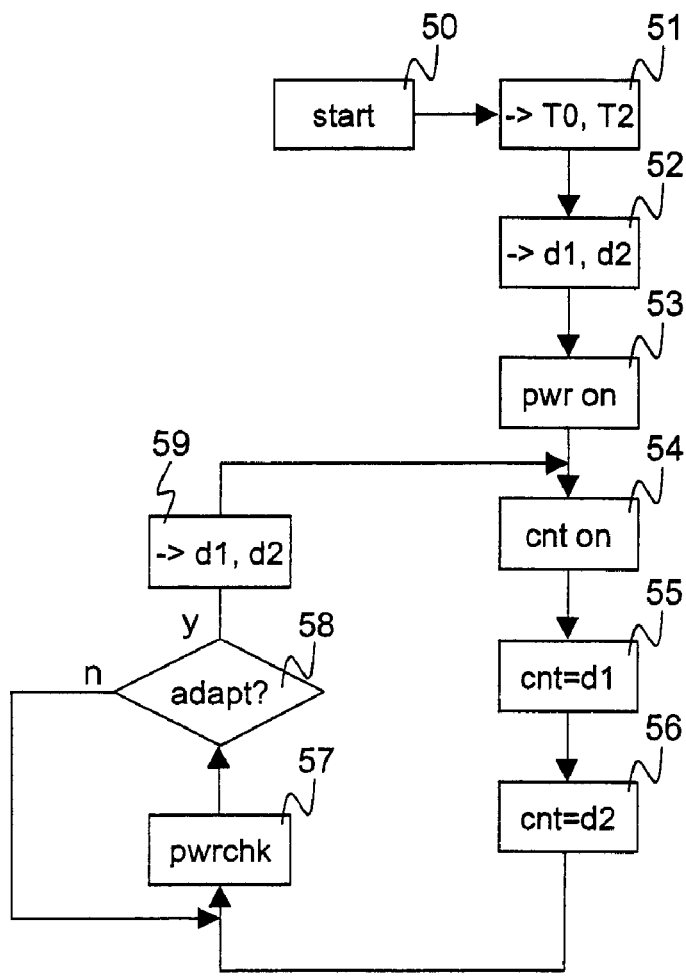
FIG. 5 a flow chart of the method.

FIG. 5 illustrates a flow chart of the method for the frequency stabilization. Following a start 50, in a first step 51 "→T0, T2", the measurement of the ambient temperature T0 and optionally of the tube temperature T2 and possibly of the oven temperature T1 is carried out. In a subsequent step 52 "→d1, d2", from this the actuating control variable is calculated. Here this is a first value d1 for the number of modes, during which heating is to take place, and a second value d2 for the number of modes, during which a reduced heating or cooling is to take place. In a following step 53 "pwr on", the laser tube 1 and the Peltier elements 4 are put into operation or started up, i.e. supplied with energy.

In a subsequent fourth step 54 "cnt on", the mode counter is started and counts the modes passed through during the heating up. In a following fifth step 55 "cnt=d1", a comparator detects when the number of modes passed through exceeds a first value d1 and in this case reduces the heating power or activates the cooling. In a subsequent sixth step 56 "cn=d2", a comparator detects when the number of modes passed through exceeds the second value d2 and in this case switches over to the mode control or continuous operation control.

If the system is not switched off, in a following seventh step 57 "pwrchk", it is repeatedly checked, whether the power of the Peltier elements 4 exceeds a predefined threshold value. If this should be the case, then the ambient temperature has changed, or else the stationary operating condition at the ambient temperature is not anymore the same as during the original determination of d1 and d2. In order to still make the operation as energy-saving as possible, in a following branching 58 "adapt?", a suggestion is made to the user for a manually triggerable adaptation, and the input of the user is checked. If he agrees to the adaptation, in the following ninth step 59 "→d1, d2", the values for d1 and d2 are recalculated. Subsequently, operation is continued with the fourth step 54, with the new values of d1 and d2. During the renewed adjustment in accordance with the steps 54 to 56, no interferometric measurements can be made.

LIST OF REFERENCE SIGNS

1 Lasertube
2 Metal housing
3 Heat conducting paste
4 Peltier—element
5 Peltier—cooling element
6 Power amplifier
7 Control system
8 Detection diode
9 Polarization splitter
10 Beam splitter
11 Front mirror
12 Rear mirror
13 Second detection diode
14 Tube temperature sensor
15 Oven temperature sensor
16 Ambient temperature sensor
17 Set-point generating unit

The invention claimed is:

1. A method for the frequency stabilization of a gas laser with a laser tube (1), in particular for the operation in a laser-interferometer, which in stable operation comprises a continuous operation control with the following steps:
Operating a laser for the radiation of laser light;
measuring an intensity of at least one component of the radiated laser light;
adjusting the tube temperature of the laser tube (1) in such a manner that the measured intensity is controlled to a predefined set-point value;
wherein the method during startup of the gas laser, i.e., prior to the stable operation, comprises a startup control procedure with the following steps:
Measuring an ambient temperature, wherein the ambient temperature is the temperature outside of housing parts arranged around and being in a fixed relation to the laser tube;
controlling the condition of the laser tube (1) at least approximately to a set-point state, wherein the set-point state is a function of the measured ambient temperature and corresponds to a temperature of the laser tube (1) at the measured ambient temperature in a steady state condition without any additional heating or cooling; and
switching over to the continuous operation control.

2. The method in accordance with claim 1, wherein the step of controlling the condition of the laser tube (1) at least approximately to a set-point state comprises the following steps:
measuring the tube temperature of the laser tube (1);
determining an actuating control variable in accordance with the ambient temperature and the tube temperature;
adjusting the temperature of the laser, so that the actuating control variable is controlled at least approximately to zero.

3. The method in accordance with claim 2, wherein the actuating control variable is a number of modes of the gas laser, comprising the following step for determining the actuating control variable:
Determining the actuating control variable as the number of modes to be passed through between the condition corresponding to the tube temperature and the set-point state.

4. The method in accordance with claim 2, wherein the actuating control variable is a number of modes of the gas laser, comprising the following steps for determining the actuating control variable:
Determining the number of modes passed through from a predefined function in dependence of the ambient temperature;
when the difference between the tube temperature and the ambient temperature exceeds a predefined threshold, correcting the number of modes to be passed through in accordance with this difference.

5. The method in accordance with claim 3, comprising the further steps:
Monitoring of the heating power and cooling power during the continuous operation control;
when the heating power or cooling power during a predefined period of time exceeds a predefined threshold value: Renewed carrying out of the startup control, taking into account the tube temperature.

6. The method in accordance with claim 3, comprising the following steps:
Heating up the laser tube (1) with a predefined maximum heating power during a first number of modes passed through;
heating up the laser tube (1) with a predefined reduced heating power or cooling down the laser tube (1) with a predefined cooling power during a second number of modes passed through.

7. The method in accordance with claim 2, wherein the actuating control variable is a temperature difference, comprising the following steps for the determination of the actuating control variable:
Determining the temperature of the laser tube (1) in the set-point state in accordance with the ambient temperature;
determining the actuating control variable as the difference between the tube temperature and the temperature of the laser tube (1) in the set-point state.

8. A frequency stabilized gas laser, in particular for the utilization in a laser interferometer, comprising
a laser tube (1) for radiating laser light,
a detector (8) for measuring the intensity of at least one component of the radiated laser light, and
a control system (7), which in a first operating condition is designed as a continuous operation control system, by which continuous operation control system, for the adjustment of a tube temperature of the laser tube (1), the measured intensity is controlled to a predefined set-point value,
wherein the gas laser further comprises
an ambient temperature sensor (16) and
a set-point generating unit (17) for determining a set-point state according to an ambient temperature measured by the ambient temperature sensor (16),
wherein the set-point state corresponds to a temperature of the laser tube (1) at the measured ambient temperature in the steady condition without any further heating or cooling and wherein the ambient temperature is the temperature outside of housing parts arranged around and being in a fixed relation to the laser tube, and that the control system (7), in a second operating condition, is designed as a startup control system, by which startup control system the condition of the laser tube (1) is controlled at least approximately to this set-point state, and subsequently is switched over to the continuous operation control.

9. The frequency stabilized gas laser in accordance with claim 8, further comprising a tube temperature sensor (14), wherein the set-point generating unit (17) is designed for the determination of an actuating control variable in accordance with the ambient temperature and the tube temperature, and the control system (7) in the second operating condition is also designed for the adjustment of the temperature of the gas laser, so that the actuating control variable is controlled at least approximately to zero.

10. The frequency stabilized gas laser in accordance with claim 9, wherein the actuating control variable is a number of modes to be passed through by the gas laser between the condition corresponding to the tube temperature and the set-point state.

11. The frequency stabilized gas laser in accordance with claim 9, wherein the actuating control variable is a temperature difference between the tube temperature and the temperature of the laser tube (1) in the set-point state.

* * * * *